(12) United States Patent
Yano et al.

(10) Patent No.: US 6,761,835 B2
(45) Date of Patent: Jul. 13, 2004

(54) PHOSPHOR MULTILAYER AND EL PANEL

(75) Inventors: Yoshihiko Yano, Tokyo (JP); Katsuto Nagano, Tokyo (JP)

(73) Assignee: TDK Corporation, Tokyo (JP)

( * ) Notice: Subject to any disclaimer, the term of this patent is extended or adjusted under 35 U.S.C. 154(b) by 501 days.

(21) Appl. No.: 09/866,692

(22) Filed: May 30, 2001

(65) Prior Publication Data

US 2002/0005506 A1 Jan. 17, 2002

(30) Foreign Application Priority Data

| Jul. 7, 2000 | (JP) | 2000-206652 |
| Oct. 3, 2000 | (JP) | 2000-303718 |
| Oct. 3, 2000 | (JP) | 2000-303719 |
| May 11, 2001 | (JP) | 2001-142024 |

(51) Int. Cl.$^7$ .......................... C09K 11/08; H01J 63/04
(52) U.S. Cl. .................. 252/301.4 S; 252/301.6 S; 313/502; 313/503
(58) Field of Search .................. 252/301.4 S, 301.6 S; 313/502, 503

(56) References Cited

U.S. PATENT DOCUMENTS

| 5,753,934 A | * | 5/1998 | Yano et al. | 257/30 |
| 5,801,105 A | * | 9/1998 | Yano et al. | 438/785 |
| 5,810,923 A | * | 9/1998 | Yano et al. | 117/84 |
| 5,828,080 A | * | 10/1998 | Yano et al. | 257/43 |
| 5,919,515 A | * | 7/1999 | Yano et al. | 427/126.3 |
| 5,955,213 A | * | 9/1999 | Yano et al. | 428/700 |
| 5,985,404 A | * | 11/1999 | Yano et al. | 428/65.3 |
| 6,045,626 A | * | 4/2000 | Yano et al. | 148/33.4 |
| 6,096,434 A | * | 8/2000 | Yano et al. | 428/446 |
| 6,198,208 B1 | * | 3/2001 | Yano et al. | 310/358 |
| 6,258,459 B1 | * | 7/2001 | Noguchi et al. | 428/446 |
| 6,387,712 B1 | * | 5/2002 | Yano et al. | 438/3 |
| 6,550,920 B2 | * | 4/2003 | Hosoda et al. | 353/58 |
| 6,597,108 B2 | * | 7/2003 | Yano et al. | 313/503 |
| 6,614,173 B2 | * | 9/2003 | Yano et al. | 313/503 |
| 6,627,251 B2 | * | 9/2003 | Yano et al. | |

FOREIGN PATENT DOCUMENTS

| EP | 0 740 490 A1 | 10/1996 |
| JP | 8-134440 | 5/1996 |
| JP | 2840185 | 10/1998 |

OTHER PUBLICATIONS

U.S. patent application Ser. No. 09/866,692, Yano et al., filed May 30, 2001.
U.S. patent application Ser. No. 09/988,144, Yano et al, filed Nov. 19, 2001.
U.S. patent application Ser. No. 10/125,477, Yano et al., filed Apr. 19, 2002.
U.S. patent application Ser. No. 10/125,412, Yano et al., filed Apr. 19, 2002.
U.S. patent application Ser. No. 10/329,357, Yano et al., filed Dec. 27, 2002.
U.S. patent application Ser. No. 10/347,441, Yano et al., filed Jan. 21, 2003.

(List continued on next page.)

Primary Examiner—Margaret B. Medley
(74) Attorney, Agent, or Firm—Oblon, Spivak, McClelland, Maier & Neustadt, P.C.

(57) ABSTRACT

The invention aims to provide a phosphor multilayer eliminating a need for filters, having a satisfactory color purity and useful in white monochromatic EL devices, and an EL panel. Such objects are achieved by a phosphor multilayer comprising at least a first thin film and a second thin film wherein the first thin film is formed of a matrix material comprising barium aluminate as a main component, containing sulfur element and further containing Eu as a luminescent center, and the second thin film is formed of a matrix material comprising zinc sulfide as a main component, and an EL panel using the same.

5 Claims, 2 Drawing Sheets

OTHER PUBLICATIONS

U.S. patent application Ser. No. 10/358,345, Yano et al., filed Feb. 5, 2003.

U.S. patent application Ser. No. 10/082,270, Nagano et al., filed Feb. 26, 2002.

A. Y. Ono, Display and Imaging, vol. 3, pp. 159–171, "Recent Progress In Color El Displays," 1994 (with partial English translation).

M. Kawanishi, et al., Technical Report of IEICE. EID98–113, pp. 19–24, "$C_2Al_2S_4$:Ce Thin Film El Devices Prepared by The Two Targets Pulse Electron–Beam Evaporation," Jan. 1999 (with partial English translation).

N. Miura, et al., Jpn. J. Appl. Phys., vol. 38, Part 2, No. 11B, pp. L1291–1292, "High–Luminance Blue–Emitting $BaAl_2S_4$:Eu Thin–Film Electroluminescent Devices," Nov. 15, 1999.

S. Oshio, et al., Display and Imaging, vol. 3, No. 2, pp. 181–187, "Novel Electroluminescent Thin Films:Thiogallate–Type Phosphors," 1994 (with Concise Explanation and partial English translation).

P. C. Donohue, et al., J. Electrochem. Soc., vol. 121, No. 1, pp. 137–141, "The Synthesis and Photoluminescence of $M^{ii}M_2^{iii}(S,Se)_4$," Jan. 1974.

I. Tanaka, et al., The 22nd Seminar Data Photoelectric Inter–Conversion the 125th Commission El Department, pp. 16–21, "Composition and Optical Properties of Blue–Emitting $BaAl_2S_4$:$Eu^{2+}$Electroluminescent Thin Films", May 26, 2000 (with Concise Explanation and partial English translation).

P. Benalloul, et al., Appl. Phys. Lett., vol. 63, No. 14, pp. 1954–1956, "$IIA-III_2-S_4$ Ternary Compounds: New Host Matrices for Full Color Thin Film Electroluminescence Displays," Oct. 4, 1993.

K. T. Le Thi, et al., Materials Science and Engineering, vol. B14, pp. 393–397, "Investigation of The $MS-Al_2S_3$ Systems (M=Ca, Sr, Ba) And Luminescence Properties of Europium–Doped Thioaluminates," 1992.

* cited by examiner

PHOSPHOR MULTILAYER AND EL PANEL

BACKGROUND OF THE INVENTION

1. Technical Field

This invention relates to a light-emitting layer for use in inorganic EL devices, and more particularly, to a white light emitting multilayer of phosphor thin films and an EL panel using the same.

2. Background Art

In the recent years, active research works have been made on thin-film EL devices as small-size and large-size, light-weight flat displays. A monochromatic thin-film EL display using a phosphor thin film of manganese-doped zinc sulfide capable of emitting yellowish orange light has already become commercially practical as a dual insulated structure using thin-film insulating layers 2 and 4 as shown in FIG. 2. In FIG. 2, a predetermined pattern of lower electrodes 5 is formed on a substrate 1, and a first insulating layer 2 is formed on the lower electrodes 5. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primaries of red, green and blue have poor characteristics. Engineers continued research on SrS:Ce (using SrS as a matrix material and Ce as a luminescent center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, its luminance is still short as the blue color for full-color displays and its chromaticity is shifted toward green. There is a desire to have a better blue light-emitting layer.

To solve the above problem, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shinshu Univ. Technical Report, EID 98-113, pp. 19–24, and Jpn. J. Appl. Phys., Vol. 38 (1999), pp. L1291–1292. These thiogallate base phosphors are satisfactory in color purity, but suffer from a low luminance and especially, difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. In particular, thioaluminate base phosphors are quite difficult to control their composition.

On the other hand, monochromatic displays using orange phosphor ZnS:Mn have already become commercially practical. The visibility of displayed images imposes a need for white mono-color. To meet the need, a variety of white phosphors have been studied as described in Display & Imaging, Vol. 3 (1994), pp. 159–171.

In the prior art, ZnS:Pr thin film having praseodymium added as a luminescent center is known as the white phosphor. Since the spectrum of light emission consists of bright lines, this thin film develops a thin film interference effect. There still remain problems of visual angle dependency and a low luminance. Meanwhile, a variety of white phosphors have been developed as by starting with blue-green phosphor of SrS:Ce and adding a red component such as europium or manganese thereto.

For example, there are known:
(1) a method of adding both Ce and Eu as the luminescent center to SrS matrix material to form SrS:Ce, Eu,
(2) a method of using a multilayer structure of SrS:Ce and SrS:Eu to form SrS:Ce/SrS:Eu,
(3) a method of using a multilayer structure of SrS:Ce and CaS:Eu to form SrS:Ce/CaS:Eu, and
(4) a method of using a multilayer structure of SrS:Ce and ZnS:Mn to form SrS:Ce/ZnS:Mn.

These white phosphor thin films based on SrS:Ce emit a broad spectrum of light and are ideal for white light emission, but provide a low luminance and a white color close to yellow, known as egg-shell white. From the standpoint of human factor engineering, a color close to paper white, that is, CIE chromaticity coordinates of x=0.3 and y=0.3 has not been available unless filters are used.

SUMMARY OF THE INVENTION

An object of the invention is to provide a phosphor multilayer eliminating a need for filters, having a satisfactory color purity and suitable for use in paper white mono-color EL panels, and an EL panel.

This and other objects are attained by the present invention which is defined below as (1) to (4).

(1) A phosphor multilayer comprising at least a first thin film and a second thin film, wherein
said first thin film is formed of a matrix material comprising barium aluminate as a main component, containing sulfur element and further containing europium as a luminescent center, and
said second thin film is formed of a matrix material comprising zinc sulfide as a main component.

(2) The phosphor multilayer of (1) wherein the molar ratio of the content of sulfur element admixed to the content of oxygen element in the matrix material, as expressed by S/(S+O), is between 0.02 and 0.5.

(3) The phosphor multilayer of (1) wherein the molar ratio of the content of sulfur element admixed to the content of oxygen element in the matrix material, as expressed by S/(S+O), is between 0.7 and 0.9, and the ratio of aluminum element Al to barium element Ba, as expressed by Al/Ba, is between 1.5 and 3.0.

(4) The phosphor multilayer of (1) or (2) wherein the synthetic color of emissions from said first and second thin films is white having CIE chromaticity coordinates of x=0.27 to 0.39 and y=0.27 to 0.38.

(5) An EL panel having the phosphor multilayer of any one of (1) to (4).

DESCRIPTION OF THE PREFERRED EMBODIMENTS

Figure 1:
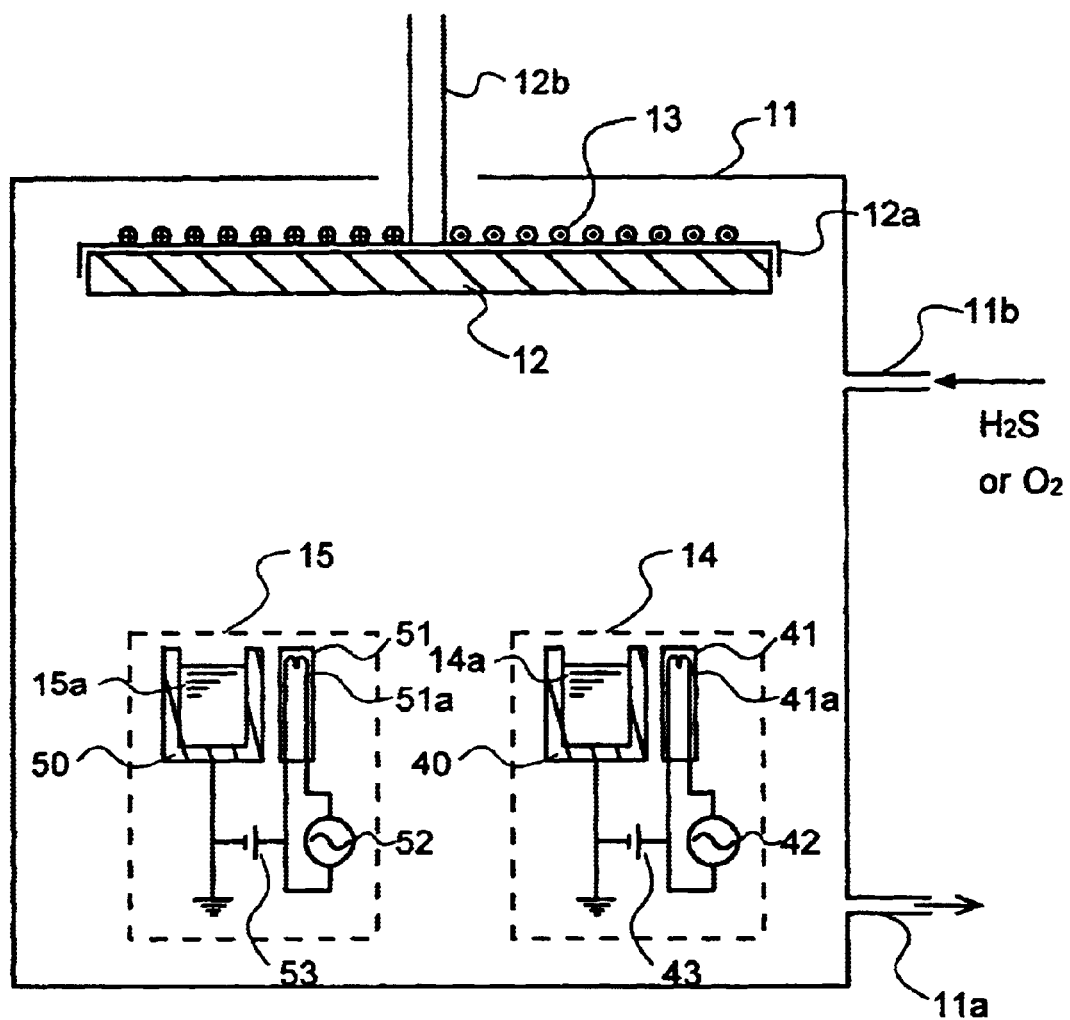
FIG. 1 is a schematic cross-sectional view showing an exemplary construction of the apparatus to which the method of the invention is applicable or the manufacturing apparatus of the invention.

Several embodiments of the invention are described in detail.

The invention provides a multilayer structure of phosphor thin-films comprising stacked first thin films and second thin films. The resulting multilayer phosphor emits white light as a result of synthesis of color emissions from the respective layers.

The first thin film uses barium aluminate (which is an oxide) as a matrix material.

Heretofore, the use of alkaline earth aluminates as the thin film phosphor for EL has not been reported. This is probably because alkaline earth aluminates are difficult to form crystalline thin films and thus cannot be utilized as phosphor thin films capable of electroluminescent light emission. The application of alkaline earth aluminates to plasma display panels (PDP) and fluorescent lamps has been discussed. By adding europium to a barium substance such as barium carbonate and an aluminum substance such as alumina and firing the mixture at 1,100° C. to 1,400° C., a powder is synthesized which is used as a blue phosphor.

The inventors formed thin films of barium aluminate as thin film phosphors intended for EL application. EL devices were prepared using the thin films, but they failed to produce the desired light emission. Only after annealing at 1,100° C., electroluminescent light emission was observed. However, the emission luminance was as low as 2 cd/m$^2$. In order that the thin films be applied to EL device panels, it is necessary to increase the luminance and lower the processing temperature.

Based on these empirical results, the inventors continued research on phosphor thin films of the above series and reached the present invention. It has been found that an outstanding increase of luminance is accomplished by adding sulfur to the barium aluminate matrix material.

The first thin film according to the invention is formed of a barium aluminate matrix material (barium aluminate being an oxide), which contains sulfur and further contains europium element as a luminescent center.

The phosphor thin film preferably has the following compositional formula:

$$Ba_xAl_yO_zS_w:Eu.$$

In the above formula, x, y, z and w denote molar ratios of elements Ba, Al, O and S, and are preferably in the ranges of:

x=1 to 5,
y=1 to 15,
z=3 to 30, and
w=3 to 30.

Preferably, the barium aluminate matrix material contains sulfur in such amounts that the atomic ratio of sulfur to oxygen, as expressed by S/(S+O), is in the range from 0.01 to 0.95, and especially from 0.02 to 0.7. Differently stated, the value of w/(z+w) in the formula is preferably in the range of 0.02 to 0.7, more preferably 0.02 to 0.50, even more preferably 0.03 to 0.35. It is also preferred that y/x be in the range of 5 to 7.

In the above formula, when the value of w/(z+w) is in the range of 0.7 to 0.9, preferably 0.75 to 0.85, it is recommended that the atomic ratio of element Al to element Ba, Al/Ba or y/x, be in the range of 1 to 3, preferably 1.5 to 3.0, and especially 2.0 to 2.5.

Sulfur is effective for outstandingly enhancing the electroluminescent luminance of phosphor thin films. The addition of sulfur to alkaline earth aluminates promotes crystallization of the matrix material during film deposition or during post treatment such as annealing after film deposition, and permits the europium added to become divalent and undertake effective transition within the compound crystal field, producing light emission at a high luminance.

The light emitting device has a lifetime in that the luminance drops with the lapse of light emitting time. The co-presence of oxygen and sulfur improves the lifetime performance and prevents the luminance from dropping. As compared with the matrix material of pure sulfide, the matrix material having an oxygen compound incorporated therein is stable in air. This is probably because the stable oxide component protects the sulfide component in the film from oxygen. Therefore, according to the inventors' investigation, an optimum value exists between the sulfide and oxide compositions.

Also in $Ba_xAl_yO_zS_w:Eu$, barium may be partially substituted with Mg, Ca or Sr, and aluminum may be partially substituted with B, Ga, In or Tl. Such substitution enables to adjust the chromaticity of white color.

Further, europium is preferably added as the luminescent center. An appropriate amount of europium added is 1 to 10 mol % based on the barium atoms. Another rare earth element may be added along with europium or alone. For example, the rare earth element is selected from among Sc, Y, La, Ce, Pr, Nd, Gd, Tb, Ho, Er, Tm, Lu, Sm, Eu, Dy and Yb. The addition of Ce, Tb, Ho, Sm, Yb and Nd is preferred as well as Eu. The addition of the other rare earth elements enables to adjust the chromaticity of white color.

No particular limits are imposed on the thickness of the first thin film. However, too thick a film requires an increased EL drive voltage whereas too thin a film results in a low emission efficiency. Illustratively, the film is preferably about 50 to 1,000 nm thick, especially about 100 to 400 nm although the ratio in thickness of the first thin film to the second thin film is important in order to provide a white phosphor.

The second thin film according to the invention is formed of a matrix material containing zinc sulfide as a main component. The matrix material containing zinc sulfide as a main component may form a solid solution or laminate of ZnS with MgS, SrS, BaS or the like. The luminescent center used herein is one or more elements selected from among transition metals such as Mn and Cu, rare earth metal elements, lead (Pb) and bismuth (Bi). Especially preferred is a ZnS:Mn base phosphor which is customarily used as an orange phosphor thin film. To the second matrix material, manganese is preferably added as the luminescent center in an amount of 0.1 to 1.0 mol %, preferably 0.2 to 0.6 mol %, and especially 0.3 to 0.4 mol % based on the second matrix material. The above-mentioned solid solution of ZnS enables to adjust the chromaticity of the orange color of ZnS:Mn, thereby enabling to adjust the chromaticity of white color according to the invention.

No particular limits are imposed on the thickness of the film. However, too thick a film requires an increased EL drive voltage whereas too thin a film results in a low emission efficiency. Illustratively, the film is preferably about 300 to 2,000 nm thick, especially about 400 to 800 nm.

The order and number of stacking the first and second thin films are not critical. A plurality of first thin films of the same or different compositions and a plurality of second thin films of the same or different compositions may be used. For example, a plurality of ZnS:Mn phosphor films and a plurality of solid solution ZnMgS:Mn phosphor films may be used for the second thin films. When the invention is embodied as a full-color display by using the white light according to the invention, and taking out red, green and blue therefrom through filters, the red, green and blue can be adjusted by a choice from the plurality of films. Of these films, it is recommended to form in advance the film which is to be deposited at a higher temperature. That is, it is recommended that the thin film which is to be deposited at a higher temperature be on the substrate side. Often, the second thin film is preferably formed on the first thin film.

By adjusting the ratio of the total thickness T2 of second thin films to the total thickness T1 of first thin films, T2/T1, the white color or chromaticity can be adjusted. Too high a T2/T1 ratio leads to a white color close to yellow whereas too low a T2/T1 ratio leads to a pale blue white color.

In the multilayer of the invention, the synthetic color of light emissions from the first thin films and light emissions from the second thin films is high purity white having CIE chromaticity coordinates of x=0.27 to 0.39 and y=0.27 to 0.38, especially x=0.30 to 0.36 and y=0.30 to 0.35.

The first thin film is preferably prepared, for example, by a reactive deposition process to be described below.

Exemplary and preferred methods include a binary reactive deposition process using a barium oxide pellet having europium added thereto, an alumina pellet, and $H_2S$ gas; a binary vacuum evaporation process using a barium sulfide pellet having europium added thereto and an alumina pellet in the absence of a gas; a binary reactive deposition process using a barium oxide pellet having europium added thereto, an alumina pellet and $H_2S$ gas; a binary vacuum evaporation process using a barium sulfide pellet having europium added thereto and an alumina pellet in the absence of gas; a binary vacuum evaporation process using a barium oxide pellet having europium added thereto and an aluminum sulfide pellet in the absence of gas; a binary reactive deposition process using a barium sulfide pellet having europium added thereto, an aluminum sulfide pellet and $H_2S$ gas; and a binary reactive deposition process using a barium sulfide pellet having europium added thereto, an aluminum sulfide pellet, and $O_2$ gas. After the sulfide thin film is formed, it may be annealed in an oxidizing atmosphere for converting to a sulfur-added barium aluminate thin film.

Europium added to the source substance may take the form of metal, fluoride, oxide or sulfide. Since the amount of europium added varies depending on the source substance and the thin film to be deposited, the composition of the source substance is adjusted so as to achieve an appropriate dosage.

During the evaporation, the temperature of the substrate may be at 100 to 600° C., preferably 150 to 300° C. If the substrate temperature is too high, the thin film of matrix material may have more asperities on its surface and contain pin holes therein, giving rise to the problem of current leakage on EL devices. For this reason, the aforementioned temperature range is preferable. After deposition, the film is preferably annealed. The annealing temperature is preferably 600 to 1,000° C., especially 800 to 900° C.

The oxide phosphor thin film thus formed is preferably a highly crystalline thin film. Crystallinity can be evaluated by x-ray diffraction, for example. To promote crystallinity, the substrate temperature is set as high as possible. It is also effective to anneal the thin film in vacuum, air, $O_2$, $N_2$, Ar, sulfur vapor, or $H_2S$ after its formation.

The pressure during evaporation is preferably $1.33 \times 10^{-4}$ to $1.33 \times 10^{-1}$ Pa ($1 \times 10^{-6}$ to $1 \times 10^{-3}$ Torr). When a gas such as $H_2S$ is introduced, the pressure may be adjusted to $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The rate of gas feed is preferably 5 to 200 standard cubic centimeters per minute (SCCM), especially 10 to 30 SCCM although it varies depending on the power of the vacuum system.

If desired, the substrate may be moved or rotated during evaporation. By moving or rotating the substrate, the deposited film becomes uniform in composition and minimized in the variation of thickness distribution.

When the substrate is rotated, the number of revolutions is preferably at least about 10 rpm, more preferably about 10 to 50 rpm, and especially about 10 to 30 rpm. If the rotational speed of the substrate is too high, there may arise a problem of seal upon admission into the vacuum chamber. If the rotational speed of the substrate is too low, compositional gradation may occur in the thickness direction within the chamber so that the characteristics of the light emitting layer may become poor. The means for rotating the substrate may be any well-known rotating mechanism including a power source such as a motor or hydraulic rotational mechanism and a power transmission/gear mechanism having a combination of gears, belts, pulleys and the like.

The means for heating the evaporation source and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

FIG. 1 illustrates one exemplary construction of the apparatus for forming the light emitting layer according to the invention. Reference is made to an embodiment wherein S-added barium aluminate:Eu is produced by using aluminum sulfide and barium sulfide as the evaporation sources and admitting oxygen during evaporation. In the illustrated embodiment, a substrate 12 on which the light emitting layer is to be deposited, and EB evaporation sources 14 and 15 are disposed within a vacuum chamber 11.

The electron beam (EB) evaporation sources 14 and 15 serving as means for evaporating aluminum sulfide and barium sulfide include crucibles 40 and 50 which contain barium sulfide 14a having a luminescent center added thereto and aluminum sulfide 15a, and electron guns 41 and 51 having electron emitting filaments 41a and 51a built therein, respectively. Built in the electron guns 41, 51 are mechanisms for controlling electron beams. To the electron guns 41, 51 are connected ac power supplies 42, 52 and bias power supplies 43, 53. The electron guns 41, 51 alternately produce electron beams at predetermined powers in a controlled manner, which are irradiated to the crucibles for evaporating the barium sulfide having a luminescent center added thereto and the aluminum sulfide in a predetermined ratio. Also employable is a process in which multi-source simultaneous evaporation is performed using a single electron gun, which is known as multi-source pulse evaporation process. Although EB evaporation sources are used as evaporation sources of aluminum sulfide and barium sulfide in the illustrated embodiment, either one or both may be replaced by other evaporation sources such as resistive heating evaporation sources.

The vacuum chamber 11 has an exhaust port 11a through which the chamber is evacuated to establish a predetermined vacuum in the chamber. The vacuum chamber 11 also has an inlet port 11b through which a reactant gas such as hydrogen sulfide gas is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined number of revolutions by a rotating means (not shown). A heating means 13 in the form of a heater wire is closely secured to the substrate holder 12a so that the substrate may be heated and maintained at the desired temperature.

Using the illustrated apparatus, vapors of barium sulfide and aluminum sulfide are evaporated from the EB evaporation sources 14, 15 and deposited on the substrate 12 where they are bound with the oxygen admitted to thereby form a sulfur-added oxide fluorescent layer. By rotating the substrate 12 during the evaporation process if desired, the light emitting layer being deposited can be made more uniform in composition and thickness distribution.

The second thin film can be formed by well-known methods including an evaporation method using a ZnS:Mn pellet and a sputtering method using a ZnS target.

There have been described the fluorescent thin film material and the method of manufacture by evaporation according to the invention, by which a phosphor thin film in multilayer structure capable of emitting white light at a higher luminance can be easily formed.

Figure 2:
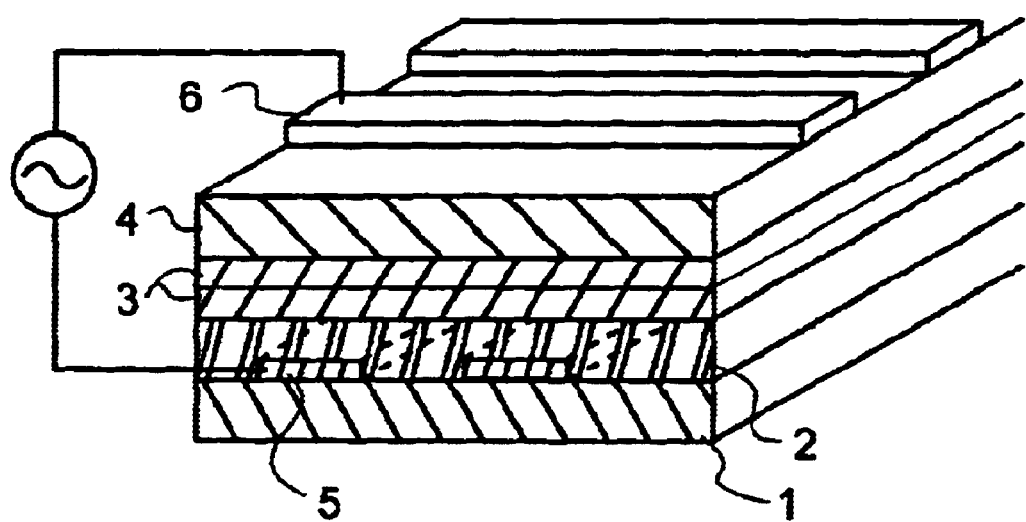
FIG. 2 is a partially cross-sectional, perspective view showing an exemplary construction of the inorganic EL device which can be manufactured by the method and apparatus of the invention.

Using a light emitting layer 3 of the invention, an inorganic EL device is manufactured, for example, to the structure shown in FIG. 2. Between the substrate 1, electrodes 5, 6, thick-film insulating layer 2 and thin-film insulating layer 4, there may be disposed intermediate layers such as a layer for enhancing bond, a layer for mitigating stress, and a layer for preventing reaction. The thick film may be improved in smoothness as by polishing its surface or using a smoothing layer.

FIG. 2 is a partially cross-sectional, perspective view showing an exemplary construction of the inorganic EL device using the phosphor multilayer of the invention. In FIG. 2, a predetermined pattern of lower electrodes 5 is formed on a substrate 1, and a first thick insulating layer (or thick-film dielectric layer) 2 is formed on the lower electrodes 5. On the first insulating layer 2, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5. The light emitting layer used herein is the phosphor multilayer.

Any desired material may used as the substrate as long as the substrate has a heat resistant temperature or melting point of at least 600° C., preferably at least 700° C., especially at least 800° C. so that the substrate may withstand the thick-film forming temperature, the forming temperature of the EL fluorescent layer and the annealing temperature of the EL device, the substrate allows deposition thereon of functional thin films such as a light emitting layer by which the EL device can be constructed, and the substrate maintains the predetermined strength. Illustrative examples include ceramic substrates of glass, alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride (SiN), and silicon carbide (SiC+BeO) as well as heat resistant glass substrates of crystallized glass or the like. Of these, alumina substrates and crystallized glass substrates having a heat resistant temperature of higher than about 1,000° C. are especially preferable. Where heat transfer is necessary, berillia, aluminum nitride, silicon carbide and the like are preferred.

Also useful are quartz, heat oxidized silicon wafers, etc. as well as metal substrates such as titanium, stainless steel, Inconel and iron base materials. Where electro-conductive substrates such as metal substrates are used, a structure in which a thick film having an internal electrode is formed on a substrate is preferred.

Any well-known thick-film dielectric material may be used as the thick-film dielectric material (first insulating layer). Materials having a relatively high permittivity are preferred.

For example, lead titanate, lead niobate and barium titanate based materials can be used.

The dielectric thick film has a resistivity of at least $10^8$ $\Omega \cdot cm$, especially about $10^{10}$ to $10^{18}$ $\Omega \cdot cm$. A material having a relatively high permittivity as well is preferred. The permittivity $\in$ is preferably about 100 to 10,000. The preferred thickness is 5 to 50 $\mu m$, especially 10 to 30 $\mu m$.

The insulating layer thick film is formed by any desired method. Methods capable of relatively easily forming films of 10 to 50 $\mu m$ thick are useful, and the solgel method and printing/firing method are especially preferred.

Where the printing/firing method is employed, a material is fractionated to an appropriate particle size and mixed with a binder to form a paste having an appropriate viscosity. The paste is applied onto a substrate by a screen printing technique, and dried. The green sheet is fired at an appropriate temperature, yielding a thick film.

Examples of the material of which the thin-film insulating layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate, PMN-PT base materials, and multilayer or mixed thin films of any. In forming the insulating layer from these materials, any of conventional methods such as evaporation, sputtering, CVD, sol-gel and printing/firing methods may be used. The insulating layer preferably has a thickness of about 50 to 1,000 nm, especially about 100 to 500 nm.

The electrode (lower electrode) is formed at least on the substrate side or within the first dielectric. As the electrode layer which is exposed to high temperature during formation of a thick film and during heat treatment along with the light emitting layer, there may be employed a customary metal electrode containing as a main component one or more elements selected from palladium, rhodium, iridium, rhenium, ruthenium, platinum, tantalum, nickel, chromium and titanium.

Another electrode layer serving as the upper electrode is preferably a transparent electrode which is transmissive to light in the predetermined emission wavelength region because the emitted light often exits from the opposite side to the substrate. When the substrate is transparent, a transparent electrode may also be used as the lower electrode because this permits the emitted light to exit from the substrate side. Use of transparent electrodes of ZnO, ITO or the like is especially preferred. ITO generally contain $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode layer may be either polycrystalline silicon (p-Si) or amorphous silicon (a-Si), or even single crystal silicon if desired.

In addition to silicon as the main component, the electrode is doped with an impurity for imparting electric conductivity. Any dopant may be used as the impurity as long as it can impart the desired conductivity. Use may be made of dopants commonly used in the silicon semiconductor art. Exemplary dopants are B, P, As, Sb, Al and the like. Of these, B, P, As, Sb and Al are especially preferred. The preferred dopant concentration is about 0.001 to 5 at %.

In forming the electrode layer from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode layer should preferably have a resistivity of up to 1 Ω·cm, especially about 0.003 to 0.1 Ω·cm in order to apply an effective electric field across the light emitting layer. The preferred thickness of the electrode layer is about 50 to 2,000 nm, especially about 100 to 1,000 nm.

Although the light emitting layer of the invention is applied to inorganic EL devices in the illustrated embodiment, it may be applied to another type of device as long as the phosphor thin film of the invention can be used therein, and especially to white light emitting devices, which can be applied to mono-color display panels.

EXAMPLE

Examples are given below for illustrating the invention in more detail.

Example 1

FIG. 1 illustrates an exemplary evaporation chamber which can be used in the manufacturing method of the invention. One electron gun and one resistive heating cell were used instead of a two-point controlled electron gun.

An EB source 15 containing BaS powder having 5 mol % of Eu added and a resistive heating cell (14) containing $Al_2S_3$ powder were placed in a vacuum chamber 11. The substances were simultaneously evaporated from the respective sources, and deposited on a rotating substrate heated at 400° C., forming a $Ba_xAl_yO_zS_w$:Eu layer. The rates of evaporation from the respective sources were adjusted so that the film was deposited on the substrate at a deposition rate of 1 nm/sec. During evaporation, $H_2S$ gas was admitted at 20 SCCM. The thin film formation was followed by annealing at 750° C. for 10 minutes in air, yielding the first thin film of 300 nm thick.

By an EB evaporation technique using a ZnS pellet having 0.5 mol % of Mn added, a second thin film of 400 nm thick was deposited on the first thin film.

The first thin film, $Ba_xAl_yO_zS_w$:Eu thin film was separately formed, and analyzed for composition by x-ray fluorescence to find an atomic ratio of Ba:Al:O:S:Eu= 7.40:19.18:70.15:2.90:0.36.

An EL device was fabricated using this light emitting layer. When an electric field having a frequency of 1 kHz and a pulse width of 50 µS was applied across the electrodes, the EL device emitted white light having a luminance of 500 cd/M² in a fully reproducible manner. The emitted light was paper white having CIE chromaticity coordinates of x=0.352 and y=0.303.

The phosphor multilayer of the invention offers a phosphor thin film material capable of emitting white light having a high color purity without a need for filters and a high luminance.

The EL devices using the phosphor multilayers according to the invention have improved emission performance and are of great commercial worth because white EL devices and monochromatic EL panels can be formed.

Benefits of the Invention

The invention provides a phosphor multilayer purity and best suited as white monochromatic EL devices, and an EL panel.

What is claimed is:

1. A phosphor multilayer comprising at least a first thin film and a second thin film, wherein said first thin film is formed of a matrix material comprising barium aluminate as a main component, containing sulfur element and further containing europium as a luminescent center, and said second thin film is formed of a matrix material comprising zinc sulfide as a main component.

2. The phosphor multilayer of claim 1 wherein the molar ratio of the content of sulfur element admixed to the content of oxygen element in the matrix material, as expressed by S/(S+O), is between 0.02 and 0.5.

3. The phosphor multilayer of claim 1 wherein the molar ratio of the content of sulfur element admixed to the content of oxygen element in the matrix material, as expressed by S(S+O), is between 0.7 and 0.9, and the ratio of aluminum element Al to barium element Ba, as expressed by Al/Ba, is between 1.5 and 3.0.

4. The phosphor multilayer of claim 1 wherein the synthetic color of emissions from said first and second thin films is white having CIE chromaticity coordinates of x=0.27 to 0.39 and y=0.27 to 0.38.

5. An EL panel having the phosphor multilayer of claim 1.

* * * * *